United States Patent
Chang et al.

(10) Patent No.: US 12,143,876 B2
(45) Date of Patent: Nov. 12, 2024

(54) METHOD FOR RADIO LINK FAILURE RECOVERY AND USER EQUIPMENT

(71) Applicant: SHARP KABUSHIKI KAISHA, Sakai (JP)

(72) Inventors: Ningjuan Chang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 389 days.

(21) Appl. No.: 17/628,161

(22) PCT Filed: Jul. 22, 2020

(86) PCT No.: PCT/CN2020/103471
§ 371 (c)(1),
(2) Date: Jan. 18, 2022

(87) PCT Pub. No.: WO2021/013170
PCT Pub. Date: Jan. 28, 2021

(65) Prior Publication Data
US 2022/0322173 A1 Oct. 6, 2022

(30) Foreign Application Priority Data
Jul. 23, 2019 (CN) .......................... 201910670623.2

(51) Int. Cl.
*H04W 36/00* (2009.01)
*H04W 36/08* (2009.01)

(52) U.S. Cl.
CPC . *H04W 36/00837* (2018.08); *H04W 36/0058* (2018.08); *H04W 36/08* (2013.01)

(58) Field of Classification Search
CPC . H04W 76/27; H04W 36/08; H04W 36/0058; H04W 36/00837; H04W 36/305; H04W 36/00835; H04W 36/36
See application file for complete search history.

(56) References Cited

U.S. PATENT DOCUMENTS

2019/0215887 A1* 7/2019 Burbidge .............. H04W 76/27
2020/0351968 A1* 11/2020 Yilmaz ................. H04W 76/19
(Continued)

FOREIGN PATENT DOCUMENTS

CN 104219787 A 12/2014

OTHER PUBLICATIONS

China Telecom et al., "New Work Item on even further Mobility enhancement in E-Utran", RP-190272, 3GPP TSG RAN meeting #83, Shenzhen, China, Mar. 18-21, 2019.
(Continued)

Primary Examiner — Mahran Y Abu Roumi
(74) Attorney, Agent, or Firm — ScienBiziP, P.C.

(57) ABSTRACT

Provided in the present invention are a method for radio link failure recovery and user equipment. The method for radio link failure recovery includes: initiating, by user equipment (UE), an RRC connection re-establishment procedure; in a cell selection procedure of the RRC connection re-establishment procedure, if a selected cell is a conditional handover candidate cell of the UE, then performing, by the UE, a handover to the selected cell; and if the selected cell is not a conditional handover candidate cell of the UE, then suspending, by the UE, all radio bearers except signaling radio bearer 0 (SRB0), and continuing the RRC connection re-establishment procedure.

2 Claims, 2 Drawing Sheets

(56) References Cited

U.S. PATENT DOCUMENTS

2022/0014985 A1* 1/2022 Da Silva ......... H04W 36/00838
2023/0389049 A1* 11/2023 Kim ........................ H04W 4/06

OTHER PUBLICATIONS

Intel Corporation, "New WID: NR mobility enhancements", RP-181433, 3GPP TSG RAN Meeting #80, La Jolla, USA, May 21-May 25, 2018.

ZTE Corporation et al., "Discussion on fast HO failure recovery", R2-1907094, 3GPP TSG RAN WG2 Meeting #106, 1 Reno, USA, May 13-17, 2019.

* cited by examiner

METHOD FOR RADIO LINK FAILURE RECOVERY AND USER EQUIPMENT

TECHNICAL FIELD

The present disclosure relates to the technical field of wireless communications. More specifically, the present disclosure relates to a method for radio link failure recovery and corresponding user equipment.

BACKGROUND

A new research project on 5G technical standards (see non-patent literature: RP-181433: New WID on NR (New Radio) mobility enhancements) was approved in the 3rd Generation Partnership Project (3GPP) RAN #80 plenary session held in June 2018. In addition, there is another new research project on Release 16 (see non-patent literature: RP-190272: WID for Even Further Mobility Enhancement in Evolved-Universal Terrestrial Radio Access Network (E-UTRAN)). One of the research objectives of these two projects is to meet one of the mobility requirements in a network: seamless handover, namely, to achieve a handover interruption time of 0 millisecond or close to 0 millisecond in a cell handover procedure and to improve the robustness of a handover. Among currently studied solutions for reducing a handover interruption time and/or to improve the robustness of a handover, a solution is referred to as a conditional handover (CHO). In a CHO function, a base station delivers a handover command to UE in advance, wherein the handover command includes conditional configuration information. When a configured condition is met, then the UE executes a handover according to the previously received handover command. In this case, by delivering the handover command in advance, the success rate of receiving a handover command can be improved, thereby improving the success rate of a handover, and avoiding a service interruption delay caused by a handover failure resulting from a failure in receiving a handover command.

Provided in the present disclosure are solutions to some problems encountered in implementation of the CHO in an NR system and in a long term evolution (LTE) system.

SUMMARY OF INVENTION

An objective of embodiments of the present disclosure is to provide a solution to the issue of implementing a CHO technology in an NR system and in an LTE system. More specifically, provided in the present disclosure is a solution to the issue of how to use a stored CHO configuration to recover a link connection during a radio link failure. Specifically, the present disclosure provides a method for radio link failure recovery in user equipment and the corresponding user equipment.

According to a first aspect of the present disclosure, a method for radio link failure recovery is provided, and includes: initiating, by user equipment (UE), an RRC connection re-establishment procedure; in a cell selection procedure of the RRC connection re-establishment procedure, if a selected cell is a conditional handover candidate cell of the UE, then performing, by the UE, a handover to the selected cell; and if the selected cell is not the conditional handover candidate cell of the UE, suspending, by the UE, all radio bearers except signaling radio bearer 0 (SRB0), and continuing the RRC connection re-establishment procedure.

In the method for radio link failure recovery according to the first aspect, the UE may suspend all the radio bearers except the signaling radio bearer 0 (SRB0) if the UE does not store a conditional handover configuration upon initialization of the RRC connection re-establishment procedure.

In the method for radio link failure recovery according to the first aspect, the UE may suspend all the radio bearers except the signaling radio bearer 0 (SRB0) if a reason for initiating the RRC connection re-establishment procedure is not that the radio link failure (RLF) of the master cell group (MCG) is monitored or is not handover failure upon initialization of the RRC connection re-establishment procedure.

In the method for radio link failure recovery according to the first aspect, determination of whether the cell selected by the UE is the conditional handover candidate cell of the UE may be performed when the UE is configured with conditional handover and/or the reason for initiating the RRC connection re-establishment procedure is that the RLF of the MCG is monitored or is a handover failure.

According to a second aspect of the present disclosure, a method for radio link failure recovery is provided, and comprises: initiating, by the UE, an RRC connection re-establishment procedure; suspending, by the UE, all the radio bearers except signaling radio bearer 0 (SRB0) when the RRC connection re-establishment procedure is initialized; in a cell selection procedure of the RRC connection re-establishment procedure, if a selected cell is a conditional handover candidate cell of the UE, then performing a handover to the selected cell; and if the selected cell is not a conditional handover candidate cell of the UE, then continuing, by the UE, the RRC connection re-establishment procedure.

In the method for radio link failure recovery according to the second aspect, the UE may resume the suspended radio bearer before or after performing the handover to the selected cell or in the handover procedure.

In the method for radio link failure recovery according to the second aspect, determination of whether the cell selected by the UE is the conditional handover candidate cell of the UE may be performed when the UE is configured with conditional handover and/or the reason for initiating the RRC connection re-establishment procedure is that the RLF of the MCG is monitored or is a handover failure.

In the method for radio link failure recovery according to the second aspect, determination of whether the cell selected by the UE is the conditional handover candidate cell of the UE may be performed when the UE is enabled with a conditional handover link recovery function.

According to a third aspect of the present disclosure, user equipment (UE) is provided, and comprises: a processor; and a memory storing instructions, wherein the instructions, when run by the processor, perform the method for radio link failure recovery according to the context.

BRIEF DESCRIPTION OF THE DRAWINGS

In order to understand the present disclosure and advantages thereof more fully, reference will now be made to the following description made in conjunction with the accompanying drawings.

DETAILED DESCRIPTION

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means "and/or".

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using a Long Term Evolution (LTE)/NR mobile communication system and subsequent evolved versions thereof as an exemplary application environment. However, it is to be noted that the present disclosure is not limited to the following embodiments, but may be applied to other wireless communications systems. In the present disclosure, unless otherwise specified, the concept of a cell and the concept of a base station are interchangeable. An LTE system may also refer to a 5G LTE system and a post-5G LTE system (such as an LTE system referred to as an eLTE system or an LTE system that can be connected to a 5G core network). In addition, the LTE can be replaced with an evolved universal terrestrial radio access (E-UTRA) or an evolved universal terrestrial radio access network (E-UTRAN). In the present disclosure, a handover refers to change of a primary cell initiated by a network side, the change including inter-cell change of a primary cell and intra-cell change of a primary cell. That is, a primary cell of UE is changed from a source cell to a target cell, wherein the source cell and the target cell may be the same cell or different cells. In this procedure, a secret key or a security algorithm for access layer security is also updated. The source cell may also be referred to as a source base station, or may also be a source beam or a source transmission point (TRP). The target cell may also be referred to as a target base station, or may also be a target beam or a target transmission point. The source cell refers to a connected cell serving the UE before a handover procedure is initiated, namely, a cell transmitting to the UE an RRC message including a handover command. The target cell refers to a cell connected to and serving the UE after the handover procedure is successfully completed, or a cell indicated by a target cell identifier included in the handover command. The handover command described in the present disclosure is used to trigger the UE to execute a handover. In an NR system, the handover command is an RRC reconfiguration message including a synchronized reconfiguration (Reconfigurationwithsync) information element, or rather, the handover command is an RRC reconfiguration message including a synchronized reconfiguration (Reconfigurationwithsync) information element for a master cell group (MCG). At this time, a handover may also be referred to as reconfiguration with sync for an MCG. In an LTE system, the handover command is an RRC connection reconfiguration message including a mobility control information (MobilityControlInformation) information element. The synchronized reconfiguration information element or the mobility control information element includes configuration information of the target cell, for example, the target cell identifier, a target cell frequency, common configurations of the target cell such as system information, a random access configuration used by the UE to access the target cell, a security parameter configuration of the UE in the target cell, a radio bearer configuration of the UE in the target cell, and the like. For simplicity of description, in the present disclosure, the RRC reconfiguration message is equivalent to the RRC connection reconfiguration message; similarly, an RRC reconfiguration complete message serving as a response message thereto is equivalent to an RRC connection reconfiguration complete message. An RRC connection re-establishment request message is equivalent to an RRC re-establishment request message, and an RRC re-establishment message is equivalent to an RRC connection re-establishment message; similarly, an RRC re-establishment complete message serving as a response message thereto is equivalent to an RRC connection re-establishment complete message. The handover command is equivalent to the RRC message including the handover command, and refers to an RRC message or a configuration in the RRC message triggering the UE to execute a handover. The handover configuration refers to all of or part of configurations in the handover command. "Cancel", "release", "delete", "flush", and "clear" are interchangeable. "Execute", "use", and "apply" are interchangeable. "Configure" and "reconfigure" are interchangeable. "Monitor" and "detect" are interchangeable. A conditional handover command and a conditional handover configuration are interchangeable.

In the present application, after receiving a radio resource control (RRC) message including a handover command, the UE maintains communication, including data transmission, with the source base station before initiating a handover procedure so as to further reduce data transmission interruption time.

The prior art involved in the embodiment of the present disclosure will be briefly described below.

Figure 1:
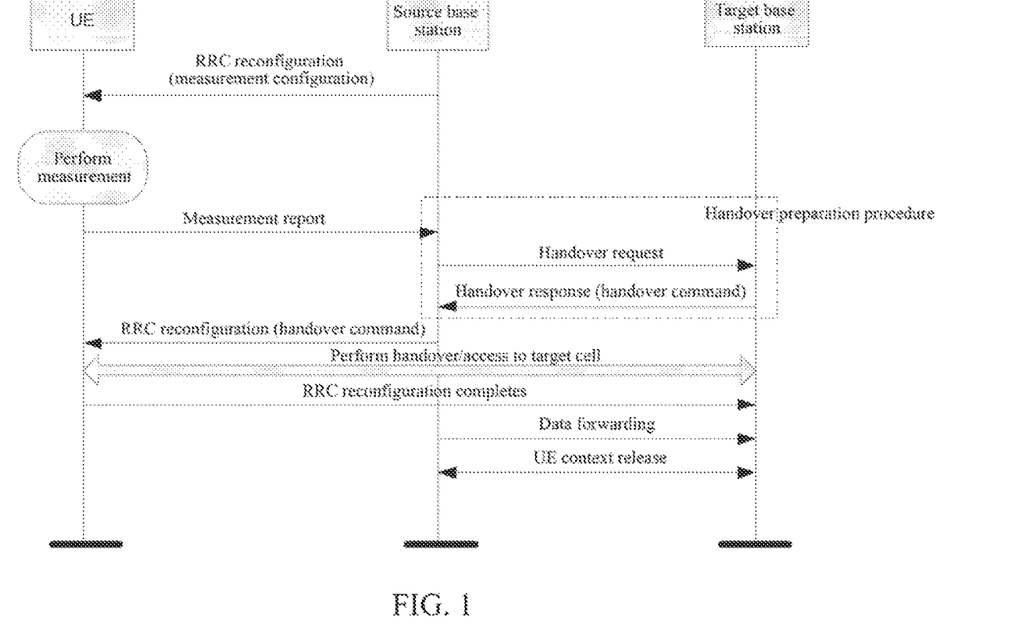
FIG. 1 is a sequence diagram showing that user equipment (UE) in a connected state changes a serving cell by means of a handover procedure.

A General Handover Procedure in an Existing Function:

User mobility in a connected state is implemented mainly by means of a handover procedure, and the handover refers to a procedure in which UE in an RRC connected state changes a serving cell. FIG. 1 is a sequence diagram showing that user equipment (UE) in a connected state changes a serving cell by means of a handover procedure; referring to FIG. 1, the specific process thereof is briefly described as follows:

Phase 1, a measurement phase. A base station delivers a measurement configuration to user equipment (UE); the UE performs, on the basis of the measurement configuration, measurement on a radio link corresponding to a serving cell or a neighboring cell; when a configured measurement reporting condition is met, the UE transmits a measurement report to the base station. The measurement phase is not mandatory, and the base station may also perform a blind handover to UE if the base station does not have any valid measurement report.

Phase 2, a handover preparation phase. The base station determines, according to the received measurement report and other factors such as a payload of the base station, whether to trigger a handover for the UE. If it is determined to trigger a handover for the UE, then a source base station initiates a handover preparation procedure by transmitting a handover request message to a target base station. The target base station determines, according to context of the UE in the handover request message, available resources of the target base station, and other factors, whether to admit this handover request for the UE. If so, then the target base station replies a handover acknowledgment message to the source base station, wherein the handover acknowledgment message includes an inter-node RRC message, namely, a handover command.

Phase 3, a handover execution phase. The source base station delivers the handover command to the UE, and starts to forward data of the UE to the target base station. UE receiving the handover command immediately uses a configuration in the handover command to execute a handover, accesses the target base station by means of a random access procedure, and transmits an acknowledgment message to the target base station. The random access procedure is not mandatory.

Phase 4, a handover completion phase. After confirming that the UE successfully accesses the target base station, the target base station transmits a handover complete message to the source base station. According to the handover complete message, the source base station may release the UE context stored thereon.

It can be learned from the above that the handover procedure in the current system may incur data transmission interruption. In an LTE system of a Release 14 version, optimizations for the handover procedure such as a random access procedure-free handover, a make before break (MBB), and the like all aim to reduce data interruption time in the handover procedure.

A Conditional Handover:

Secondly, the conditional handover is briefly described. As described above, requirements of Release 16 technologies include a data interruption delay possible of "0 ms" in a mobility handover procedure and improved robustness of a handover so as to meet mobility requirements for a seamless handover in the NR. In the current handover procedure, one reason for a handover failure and therefore a long data transmission interruption is a handover command receiving failure caused when the handover command is not delivered in a timely manner. A feasible method to address this problem is a handover based on condition (referred to simply as a conditional handover). In the conditional handover, a relatively conservative measurement report threshold is set, so that the base station acquires a measurement result in advance, and performs handover preparation with a selected target base station in advance according to the measurement result. In this case, the base station can deliver the handover command to the UE before an actual handover condition (relative to the conservative measurement report threshold) is met, wherein the handover command carries a condition for performing handover by the UE. Different from existing handover functions for the LTE, after receiving a conditional handover command, the UE does not execute a handover immediately but stores a received handover command configuration, and starts to monitor link quality of the source cell or link quality of the target cell according to a handover execution condition carried in the handover command message. Only when it is determined, by means of monitoring, that the configured handover execution condition is met, does the UE start to execute the stored handover command and access the target cell. In the present disclosure, the above handover function is referred to as a conditional handover. However, the name thereof is not limited, and the above handover function may also be referred to as a handover function supporting an advance handover command, a preliminary handover, early handover preparation, a handover containing the handover execution condition, or the like.

A Link Recovery Function in the Existing Function:

Next, an existing link recovery function is described. In the existing function, when an RLF of a master cell group occurs, the UE initiates an RRC connection re-establishment procedure to re-establish/recover a connection to a network side. In the initiated RRC connection re-establishment procedure, the UE firstly performs a cell selection procedure to select a re-establishment cell, and transmits an RRC connection re-establishment request message to the cell. When the UE receives an RRC connection re-establishment message serving as a response message, the UE re-establishes an RRC message according to the configuration in the RRC connection re-establishment message, and feeds back an RRC connection re-establishment complete message to a base station to successfully end the RRC connection re-establishment procedure. The re-establishment cell refers to a cell for the UE to transmit an RRC connection re-establishment request message and receive a corresponding response message for re-establishing RRC connection in the RRC connected state. A timer T311 is defined in the RRC re-establishment procedure. The T311 is started when the UE initiates the RRC connection re-establishment procedure. When a suitable cell for re-establishment is selected in the cell selection procedure, the T311 is stopped; and if the UE cannot select a suitable cell when the T311 expires, at this time, it is generally considered that the UE is out of coverage and the UE will leave the RRC connected state to enter an RRC idle state or an RRC inactive state (RRC_Inactive).

Radio Link Recovery Using the Stored Conditional Handover Configuration:

After the UE is configured with a conditional handover, the UE does not execute a handover immediately, but executes the handover according to a received or stored conditional handover configuration after a corresponding condition is met. During a time period from a time point when the UE receives the conditional handover configuration to a time point when the UE executes the handover according to the received conditional handover configuration, the UE still maintains communication with the source base station. During this time period, a radio link failure (RLF) between the UE and the source base station may occur. At the 106th meeting of the 3GPP RAN2 working group, the following conclusion was reached on the case in which the handover execution condition of the above conditional handover is not met and an RLF occurs: when an RLF occurs, if the conditional handover candidate cell stored by the UE has good signal quality, then a handover to this cell can be performed to recover connection to a network side instead of initiating an RRC connection re-establishment procedure; otherwise, the UE selects other non-conditional handover candidate cell to initiate an RRC connection re-establishment procedure to recover the connection to the network side. In the present disclosure, this enhanced link recovery function is referred to as a link failure recovery function based on a conditional handover configuration (for simplicity of description, this function is simply referred to as a conditional handover link recovery function). The conditional handover candidate cell refers to a (target) cell in the conditional handover configuration in the RRC message for configuring the conditional handover received by the UE, namely, a cell indicated by a cell identifier in the synchronized reconfiguration information element (ReconfigurationWithSync) or the mobility control information element (MobilityControlInfo). The network side may configure one or more handover execution condition candidate cells for the UE at the same time. For the conditional handover link recovery function, on the basis of existing protocol specifications, implementation methods are, for example, as follows.

Implementation method 1: when an RLF occurs on UE configured with a conditional handover, the UE initiates an RRC connection re-establishment procedure. According to the existing function, upon initialization of the RRC connection re-establishment procedure, the UE executes a cell selection procedure. If a selected cell is a conditional handover candidate cell, then the UE executes a handover to this cell according to a conditional handover configuration corresponding to this cell, and ends the RRC connection re-establishment procedure; if the selected cell is not a conditional handover candidate cell, then the UE continues the RRC connection re-establishment procedure, and transmits an RRC connection re-establishment request message to the selected re-establishment cell.

Implementation method 2: when an RLF occurs on UE configured with a conditional handover, the UE firstly executes a cell selection procedure; if a selected cell is a conditional handover candidate cell, then the UE executes a handover to this cell according to a conditional handover configuration corresponding to this cell; if the selected cell is not a conditional handover candidate cell, then the UE initiates an RRC connection re-establishment procedure.

The cell selection procedure may refer to the 3GPP protocol specification 38.304 or 36.304. Regardless of the implementation method 1 or the implementation method 2, in a cell selection procedure for determining whether a selected cell is a conditional handover candidate cell, if a cell selected in the cell selection procedure is a cell supporting a different radio access technology (that is, an inter-RAT cell), the UE performs an operation of entering an RRC idle state, and a reason for an RRC release is an RRC connection failure. For the operation of entering the RRC idle state, please refer to section 5.3.11 of protocol specification 38.331.

The difference between the implementation method 1 and the implementation method 2 is as follows: in the implementation method 1, the cell selection procedure for determining whether there is an available conditional handover candidate cell to recover connection is the cell selection procedure in the RRC connection re-establishment procedure; and in the implementation method 2, the cell selection procedure for determining whether there is an available conditional handover candidate cell to recover connection is not the cell selection procedure in the RRC connection re-establishment procedure, but is a cell selection procedure independent of the RRC connection re-establishment procedure.

Provided in the present disclosure is a solution mainly to the problem of how to cause UE configured with a conditional handover to recover connection to a network side when an RLF occurs. More specifically, based on the implementation method 1, the UE always initiates an RRC connection re-establishment procedure and then performs an initialization operation of the RRC connection re-establishment procedure, and these operations are performed by the UE to perform RRC connection re-establishment. However, if the cell selected by the UE in the cell selection procedure is a conditional handover candidate cell, the initialization operation is unnecessary or inappropriate, and thus the present disclosure focuses on how to process the initialization operation. In addition, based on the implementation method 2, the present disclosure focuses on how to monitor the cell selection procedure and how to reduce the unnecessary cell selection procedure.

Moreover, for the conditional handover link recovery function, if the UE selects one available conditional handover candidate cell every time RLF or handover failure occurs, but the initiated conditional handover fails, then the UE will circulate in this state. For example, when an RLF occurs on the UE configured with the conditional handover candidate cells (such as a cell 1, a cell 2, . . . , a cell 5), the UE uses the conditional handover link recovery function to select the cell 1 to initiate a conditional handover, but the handover fails as well, the UE uses the conditional handover link recovery function again to select the cell 2 to initiate a conditional handover, but the handover fails as well; similarly, the UE is in the cycle of handover failure-recurrence of conditional handover. The present disclosure also focuses on how to solve this problem.

Several embodiments performed on the UE based on the above problem in the present disclosure are as follows. In the following embodiment, the UE is configured with the conditional handover, which means that the UE receives an RRC message including a conditional handover command from a base station, stores a handover configuration in the handover command, and determines, by means of monitoring and according to a handover execution condition, whether the handover execution condition is met. The handover configuration refers to an RRC configuration generated by the UE according to the configuration in the handover command. Optionally, the handover configuration refers to an RRC configuration generated by the UE according to the configuration in the handover command and a current RRC configuration of the UE. The handover execution condition, that is, the UE executes a handover only when the condition is met, uses the handover configuration, and the handover execution condition is included in the conditional handover command. For example, the handover execution condition is a measurement event. For example, the condition is a measurement event A3 (signal quality in a neighboring cell is superior to that in a serving cell by an offset value for a period of time). The neighboring cell corresponds to the target cell for handover. Generally, all of measurement events defined in current 3GPP standard specifications 36.331 and 38.331 (see section 5.5.4), such as A1-A5, can be included in the conditional handover command as the handover execution condition.

Hereinafter, specific examples and embodiments related to the present invention are described in detail. In addition, as described above, the examples and embodiments described in the present disclosure are illustrative descriptions for facilitating understanding of the present invention, rather than limiting the present invention. In addition, the technical solution obtained by appropriately changing, combining and replacing the embodiments recorded below should be also included in the scope of the present invention.

Embodiment 1

Provided in this embodiment is a solution to the problem of how to process the initialization operation of the RRC connection re-establishment procedure in foregoing implementation method 1. In the existing function, when initiating an RRC connection re-establishment procedure, UE will suspend all radio bearers except signaling radio bearer 0 (SRB0) upon initialization. However, in the implementation method 1, if the UE selects a conditional handover candidate cell and initiates a handover to recover link connection, how to process the radio bearer is a problem solved by this embodiment. On the basis of the method described in this embodiment, the radio bearer in the initialization operation will not be suspended in advance upon initialization of the RRC connection re-establishment procedure, thus ensuring that the UE may correctly process the radio bearer when selecting a conditional handover candidate cell for link failure recovery, so that data transmission will not be affected because the radio bearer is suspended.

In step 1, UE initiates an RRC connection re-establishment procedure.

In step 2, upon the initialization of the RRC connection re-establishment procedure, if UE does not have a stored conditional handover configuration or (UE has a stored conditional handover configuration) the reason for initiating the RRC connection re-establishment procedure is not that the RLF of MCG is monitored or is not a handover failure (that is, a timer (such as T304) for detecting the handover procedure expires, also including conditional handover failure), the UE suspends all the radio bearers except the signaling radio bearer 0 (SRB0).

Figure 2:
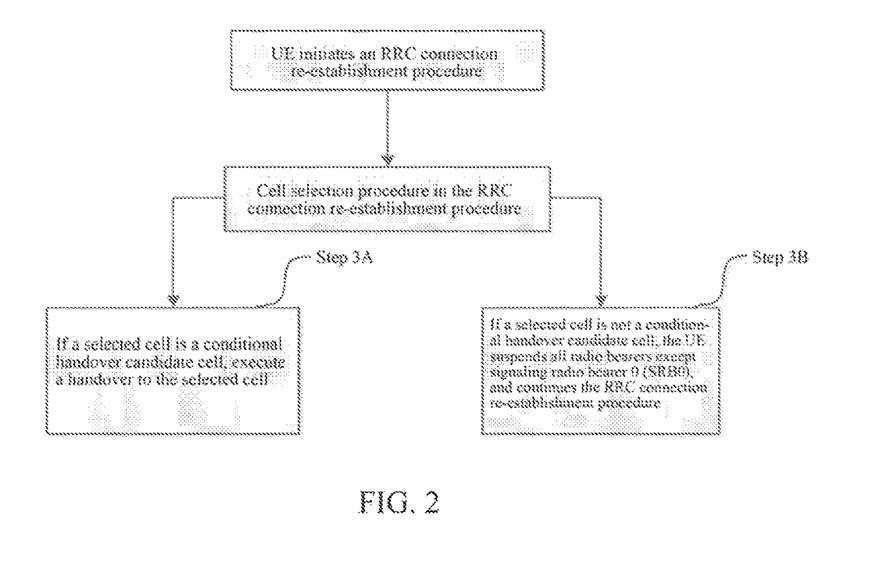
FIG. 2 is a schematic diagram showing a link failure recovery procedure in embodiment 1.

In step 3, in the cell selection procedure of the RRC connection re-establishment procedure, when a suitable cell is selected, processing is performed as follows. Specifically, as shown in FIG. 2, FIG. 2 is a schematic diagram showing a link failure recovery process in embodiment 1. If the cell selected in the cell selection procedure is a conditional handover candidate cell of the UE, step 3A is performed: the UE executes a handover to the selected cell; otherwise, if the selected cell is not a conditional handover candidate cell of the UE, step 3B is performed: the UE suspends all the radio bearers except the signaling radio bearer 0 (SRB0) and continues the RRC connection re-establishment procedure, such as initiating transmission of an RRC connection re-establishment request message.

Optionally, as described above, determination of whether the selected cell is a conditional handover candidate cell of the UE is performed by the UE when the UE is configured with the conditional handover and/or a reason for initiating the RRC connection re-establishment procedure is that an RLF of an MCG is monitored or is a handover failure (that is, a timer (such as T304) for detecting the handover procedure expires, also including conditional handover failure). Optionally, determination of whether the selected cell is a conditional handover candidate cell of the UE is performed by the UE when the UE is enabled with the conditional handover link recovery function.

The operation of the UE to suspend the radio bearers in step 3 may be performed before or after initiating the transmission of the RRC connection re-establishment request message.

In this step, the UE being configured with a conditional handover is equivalent to the UE having the stored conditional handover configuration.

The selected cell being a conditional handover candidate cell may also be that the selected cell is included in the stored conditional handover configuration, and preferably, the selected cell is included in a synchronized reconfiguration information element (ReconfigurationWithSync) in the stored conditional handover configuration or a mobile control information information element. The UE executes a handover to the selected cell, that is, a handover to this cell is executed according to the stored conditional handover configuration corresponding to this cell (or referred to as a synchronized reconfiguration). In this operation, the UE may execute a handover to this cell and recover communication with a network side as soon as possible without the need to wait until a condition corresponding to the conditional handover candidate cell is met. The operation of executing a conditional handover includes one or a plurality of the following: a timer T304 is started; a target cell RRC configuration in a conditional handover configuration corresponding to a target cell is executed; a configuration in a synchronized reconfiguration information element corresponding to the target cell is executed; downlink synchronization to the target cell is performed; random access to the target cell is performed; and an RRC reconfiguration complete message is generated and submitted to a lower layer, and is transmitted.

Embodiment 2

Provided in this embodiment is another solution to the problem of how to process the initialization operation of the RRC connection re-establishment procedure in foregoing implementation method 1. In the existing function, when initiating an RRC connection re-establishment procedure, UE will suspend all radio bearers except signaling radio bearer 0 (SRB0) upon initialization. However, in the implementation method 1, if the UE selects a conditional handover candidate cell and initiates a handover to recover link connection, how to process the radio bearer is a problem solved by this embodiment. On the basis of the method described in this embodiment, the suspended radio bearers in the initialization operation will perform a recovery operation when the UE selects a conditional handover candidate cell to perform link failure recovery, so that data transmission will not be affected because the radio bearer is suspended after handover.

In step 1, UE initiates an RRC connection re-establishment procedure.

In step 2, UE suspends all the radio bearers except the signaling radio bearer 0 (SRB0) when the RRC connection re-establishment process is initialized.

In step 3, in a cell selection procedure in the RRC connection re-establishment procedure, when a suitable cell is selected, if the selected cell is a conditional handover candidate cell of the UE, then the UE resumes all the radio bearers suspended in step 2 and executes the handover to the selected cell; otherwise, if the selected cell is not a conditional handover candidate cell of the UE, the UE continues the RRC connection re-establishment procedure, such as initiating the transmission of an RRC connection re-establishment request message.

Optionally, as described above, determination of whether the selected cell is a conditional handover candidate cell of the UE is performed by the UE when the UE is configured with the conditional handover and/or a reason for initiating the RRC connection re-establishment procedure is that an RLF of an MCG is monitored or is a handover failure (that is, a timer (such as T304) for detecting the handover procedure expires, also including conditional handover failure). Optionally, determination of whether the selected cell is a conditional handover candidate cell of the UE is performed by the UE when the UE is enabled with the conditional handover link recovery function.

The operation of the UE to resume the radio bearers in step 3 may be executed before executing the handover to the selected cell, or after initiating execution of the handover to the selected cell.

In this step, the UE being configured with a conditional handover is equivalent to the UE having the stored conditional handover configuration.

The selected cell being a conditional handover candidate cell may also be that the selected cell is included in the stored conditional handover configuration, and preferably, the selected cell is included in a synchronized reconfiguration information element (ReconfigurationWithSync) in the stored conditional handover configuration or a mobile control information information element. The UE executes a handover to the selected cell, that is, a handover to this cell is executed according to the stored conditional handover configuration corresponding to this cell (or referred to as a synchronized reconfiguration). In this operation, the UE may execute a handover to this cell and recover communication with a network side as soon as possible without the need to wait until a condition corresponding to the conditional handover candidate cell is met. The operation of executing a conditional handover includes one or a plurality of the following: a timer T304 is started; a target cell RRC configuration in a conditional handover configuration corresponding to a target cell is executed; a configuration in a synchronized reconfiguration information element corresponding to the target cell is executed; downlink synchronization to the target cell is performed; random access to the target cell is performed; and an RRC reconfiguration complete message is generated and submitted to a lower layer, and is transmitted.

Embodiment 3

Provided in this embodiment is yet another solution to the problem of how to process the initialization operation of the RRC connection re-establishment procedure in foregoing implementation method 1. In the existing function, when initiating an RRC connection re-establishment procedure, UE will suspend all radio bearers except signaling radio bearer 0 (SRB0) upon initialization. However, in the implementation method 1, if the UE selects a conditional handover candidate cell and initiates a handover to recover link connection, how to process the radio bearer is a problem solved by this embodiment. On the basis of the method described in this embodiment, the suspended radio bearers in the initialization operation will perform a recovery operation in the procedure that the UE selects a conditional handover candidate cell and executes a handover, so that data transmission will not be affected because the radio bearer is suspended after handover.

Step 1: UE initiates a conditional handover procedure.

Initiating the conditional handover procedure refers to applying the stored conditional handover configuration corresponding to the handover target cell to execute the handover to the target cell.

Step 2: if the radio bearer is suspended, UE resumes the suspended radio bearer. Preferably, the radio bearer does not include the signaling radio bearer 0 (SRB0).

In step 1, the UE initiating the conditional handover procedure is triggered because the UE selects a conditional handover candidate cell in the cell selection procedure after a link failure. Therefore, before this step, the method may further include the following steps:

step 0-1: UE initiates an RRC connection re-establishment procedure.

Step 0-2: UE suspends all the radio bearers except the signaling radio bearer 0 (SRB0) when the RRC connection re-establishment procedure is initialized.

Step 0-3: in the cell selection procedure in the RRC connection re-establishment procedure, when a suitable cell is selected, if the selected cell is a conditional handover candidate cell of the UE, the UE executes a handover to the selected cell; otherwise, if the selected cell is not a conditional handover candidate cell of the UE, the UE continues the RRC connection re-establishment procedure, such as initiating the transmission of an RRC connection re-establishment request message.

Optionally, as described above, determination of whether the selected cell is a conditional handover candidate cell of the UE is performed by the UE when the UE is configured with the conditional handover and/or a reason for initiating the RRC connection re-establishment procedure is that an RLF of an MCG is monitored or is a handover failure (that is, a timer (such as T304) for detecting the handover procedure expires, also including conditional handover failure). Optionally, determination of whether the selected cell is a conditional handover candidate cell of the UE is performed by the UE when the UE is enabled with the conditional handover link recovery function.

The selected cell being a conditional handover candidate cell may also be that the selected cell is included in the stored conditional handover configuration, and preferably, the selected cell is included in a synchronized reconfiguration information element (ReconfigurationWithSync) in the stored conditional handover configuration or a mobile control information information element. The UE executes a handover to the selected cell, that is, a handover to this cell is executed according to the stored conditional handover configuration corresponding to this cell (or referred to as a synchronized reconfiguration). In this operation, the UE may execute a handover to this cell and recover communication with a network side as soon as possible without the need to wait until a condition corresponding to the conditional handover candidate cell is met. The operation of executing a conditional handover includes one or a plurality of the following: a timer T304 is started; a target cell RRC configuration in a conditional handover configuration corresponding to a target cell is executed; a configuration in a synchronized reconfiguration information element corresponding to the target cell is executed; downlink synchronization to the target cell is performed; random access to the target cell is performed; and an RRC reconfiguration complete message is generated and submitted to a lower layer, and is transmitted.

In this step, the UE being configured with a conditional handover is equivalent to the UE having the stored conditional handover configuration.

Embodiment 4

This embodiment provides a cell selection procedure optimizing method using a conditional handover link recovery function based on the foregoing implementation method 2. In the implementation method 2, when an RLF occurs on UE configured with a conditional handover, the UE firstly executes a cell selection procedure; if a selected cell is a conditional handover candidate cell, then the UE executes a handover to this cell according to a conditional handover configuration corresponding to this cell; if the selected cell is not a conditional handover candidate cell, then the UE initiates an RRC connection re-establishment procedure. In the RRC connection re-establishment procedure, the UE also needs to execute a cell selection procedure to select a re-establishment cell according to existing function. It can be seen that in this procedure, UE may execute the cell selection procedure twice. This embodiment is intended to optimize the cell selection procedure in this case. On the basis of the method described in this embodiment, UE may omit the unnecessary cell selection procedure, thereby saving energy expense and shortening the link recovery delay.

In step 1, an RLF occurs on a radio link of UE. More precisely, the RLF occurs on an MCG link. Or a handover failure (HOF) occurs on the UE. The handover failure may be determined on the basis that the timer for monitoring the handover procedure expires, for example, T304 expires. The handover includes the conditional handover.

In step 2, if the UE is configured with a conditional handover, the UE performs a conditional handover link recovery procedure, including executing a cell selection procedure. The cell selection procedure is executed in accordance with a cell selection procedure in the standard protocol specification 38.304 or 36.304. The execution condition of step 2 further includes that the UE is enabled with the conditional handover link recovery function.

The UE being configured with a conditional handover is equivalent to the UE having the stored conditional handover configuration.

In step 3, the cell selection procedure of step 2 selects a suitable cell. If the selected cell is a conditional handover candidate cell, then step 4A is performed. If the selected cell is not a conditional handover candidate cell, then step 4B is performed.

The selected cell being a conditional handover candidate cell may also be that the selected cell is included in the stored conditional handover configuration, and preferably, the selected cell is included in a synchronized reconfiguration information element (ReconfigurationWithSync) in the stored conditional handover configuration or a mobile control information information element.

In an NR system, the selected suitable cell is an NR cell; in an LTE system, the selected suitable cell is an LTE/E-UTRAN cell.

In step 4A, the UE executes a handover to the selected cell. That is, a handover to this cell is executed according to the stored conditional handover configuration corresponding to this cell (or referred to as a synchronized reconfiguration). In this operation, the UE may execute a handover to this cell and recover communication with a network side as soon as possible without the need to wait until a condition corresponding to the conditional handover candidate cell is met. The operation of executing a conditional handover includes one or a plurality of the following: a timer T304 is started; a target cell RRC configuration in a conditional handover configuration corresponding to a target cell is executed; a configuration in a synchronized reconfiguration information element corresponding to the target cell is executed; downlink synchronization to the target cell is performed; random access to the target cell is performed; and an RRC reconfiguration complete message is generated and submitted to a lower layer, and is transmitted.

In step 4B, an RRC connection re-establishment procedure is initiated. Upon initialization of the RRC connection re-establishment procedure, UE does not need to execute the cell selection procedure to select the re-establishment cell and does not need to start T311, that is, the UE skips the cell selection procedure of the RRC connection re-establishment procedure. At this time, UE considers that the cell selected in the cell selection procedure in the conditional handover recovery function procedure in step 2 is a re-establishment cell. That is, UE takes the cell selected in the cell selection procedure in the conditional handover recovery function procedure in step 2 as a re-establishment cell.

By combining the above steps, step 4B may also be expressed as: an RRC connection re-establishment procedure is initiated; upon initialization of the RRC connection re-establishment procedure, if UE has a selected cell in the cell selection procedure before the RRC connection re-establishment procedure is initiated, the UE takes the selected cell as a re-establishment cell and does not start T311; otherwise, the UE starts T311 and executes the cell selection procedure to select a re-establishment cell. That the UE has a selected cell in the cell selection procedure before the RRC connection re-establishment procedure is initiated may also expressed as follows: the UE executes a cell selection procedure before the RRC connection re-establishment procedure is initiated; or the UE executes a conditional handover link recovery procedure before the RRC connection re-establishment procedure is initiated; or there is a selected cell in the cell selection procedure in the executed conditional handover link recovery procedure; or may be expressed as follows: the UE is configured with the conditional handover, and a reason for triggering the RRC connection re-establishment procedure is that the UE detects the RLF of the MCG or a handover failure occurs.

Embodiment 5

Provided in this embodiment is a solution to the problem of how to monitor the cell selection procedure based on the implementation method 2. In this embodiment, a timer T311 is used to monitor a cell selection procedure for selecting a conditional handover target cell in the conditional handover link recovery function. On the basis of the method described in this embodiment, UE may timely determine whether a suitable cell or a conditional handover target cell is selected, thereby avoiding overly long link failure interruption time caused by an endless cell selection procedure.

In step 1, an RLF occurs on a radio link of UE. More precisely, the RLF occurs on an MCG link. Or a handover failure (HOF) occurs on the UE. The handover failure may be determined on the basis that the timer for monitoring the handover procedure expires, for example, T304 expires. The handover includes the conditional handover.

In step 2, if the UE is configured with a conditional handover, the UE performs a conditional handover recovery procedure, including that the UE performs the following operations:
operation 1: a timer T311 is started; and
operation 2, a cell selection procedure is executed. The cell selection procedure is executed in accordance with a cell selection procedure in the standard protocol specification 38.304 or 36.304.

In this step, the UE being configured with a conditional handover is equivalent to the UE having the stored conditional handover configuration.

In step 3, the cell selection procedure of step 2 selects a suitable cell, then T311 is stopped. If the selected cell is a conditional handover candidate cell, then step 4A is performed. If the selected cell is not a conditional handover candidate cell, then step 4B is performed. If the cell selection procedure does not select a suitable cell, namely, T311 expires, then the UE performs step 4C.

The selected cell being a conditional handover candidate cell may also be that the selected cell is included in the stored conditional handover configuration, and preferably, the selected cell is included in a synchronized reconfiguration information element (ReconfigurationWithSync) in the stored conditional handover configuration or a mobile control information information element.

In an NR system, the selected suitable cell is an NR cell; in an LTE system, the selected suitable cell is an LTE/E-UTRAN cell.

In step 4A, the UE executes a handover to the selected cell.

In step 4B, the UE initiates an RRC connection re-establishment procedure.

In step 4C, an operation of entering an RRC idle state is performed, and a reason for RRC release is that RRC connection fails. For the operation of entering the RRC idle state, please refer to section 5.3.11 of protocol specification 38.331.

Embodiment 6

This embodiment provides a solution for the problem that the UE executes conditional handover link recovery function after link failure or handover failure and suffers from failure during conditional handover link recovery so as to enter the conditional handover link recovery function for recycle. In this embodiment, by limiting the times of executing the conditional handover link recovery by the UE, the UE may exit from the cycle, and recover connection to a network side through RRC connection re-establishment if the conditional handover link recovery function is not suitable.

In step 1, an MCG RLF occurs on a radio link of the UE. Or a handover failure (HOF) occurs on the UE. The handover failure may be determined on the basis that the timer for monitoring the handover procedure expires, for example, T304 expires. The handover includes the conditional handover.

Based on the foregoing implementation method 2, the UE performs the following steps:

in step 2, if the UE is configured with conditional handover, the UE compares the value of a counter COUNTER for recording the times of executing the conditional handover link recovery with a configured threshold TH. If the counter COUNTER value is greater than or greater than or equal to TH, then the UE performs step 4B. If the COUNTER value is less than or equal to or less than TH, then the UE executes the cell selection procedure. The cell selection procedure is executed in accordance with a cell selection procedure in the standard protocol specification 38.304 or 36.304. The execution condition of step 2 further includes that the UE is enabled with the conditional handover link recovery function.

The UE being configured with a conditional handover is equivalent to the UE having the stored conditional handover configuration.

In step 3, the cell selection procedure of step 2 selects a suitable cell. If the selected cell is a conditional handover candidate cell, then step 4A is performed. If the selected cell is not a conditional handover candidate cell, then step 4B is performed.

The selected cell being a conditional handover candidate cell may also be that the selected cell is included in the stored conditional handover configuration, and preferably, the selected cell is included in a synchronized reconfiguration information element (ReconfigurationWithSync) in the stored conditional handover configuration or a mobile control information information element.

In step 4A, the UE executes a handover to the selected cell. That is, a handover to this cell is executed according to the stored conditional handover configuration corresponding to this cell (or referred to as a synchronized reconfiguration). In this operation, the UE may execute a handover to this cell and recover communication with a network side as soon as possible without the need to wait until a condition corresponding to the conditional handover candidate cell is met. The operation of executing a conditional handover includes one or a plurality of the following: a timer T304 is started; a target cell RRC configuration in a conditional handover configuration corresponding to a target cell is executed; a configuration in a synchronized reconfiguration information element corresponding to the target cell is executed; downlink synchronization to the target cell is performed; random access to the target cell is performed; and an RRC reconfiguration complete message is generated and submitted to a lower layer, and is transmitted.

The step further includes that the counter COUNT value is increased by 1.

In step 4B, an RRC connection re-establishment procedure is initiated.

Based on the foregoing implementation method 1, the UE performs the following steps after step 1:

in step 2, the UE initiates an RRC connection re-establishment procedure.

In step 3, the UE selects a suitable cell in a cell selection phase in the RRC connection re-establishment procedure. If the UE is configured with conditional handover, the UE compares the value of the counter COUNTER for recording the times of executing the conditional handover link recovery with the configured threshold TH. If the counter COUNTER value is greater than or greater than or equal to TH, then the UE performs step 4A. If the COUNTER value is less than or equal to or less than TH, then the UE executes step 4B. The execution condition of step 3 further includes that the UE is enabled with the conditional handover link recovery function.

In step 4A, the UE continues the RRC connection re-establishment procedure, that is, the UE initiates transmission of an RRC connection re-establishment request message to the selected re-establishment cell. Optionally, it is further included that the value of the COUNT is reset to 0.

In step 4B, it is determined that whether the selected cell is a conditional handover candidate cell. If so, then step 5 is performed. If not, then step 4A is performed.

The selected cell being a conditional handover candidate cell may also be that the selected cell is included in the stored conditional handover configuration, and preferably, the selected cell is included in a synchronized reconfiguration information element (ReconfigurationWithSync) in the stored conditional handover configuration or a mobile control information information element.

In step 5, the UE executes a handover to the selected cell. That is, a handover to this cell is executed according to the stored conditional handover configuration corresponding to this cell (or referred to as a synchronized reconfiguration). In this operation, the UE may execute a handover to this cell and recover communication with a network side as soon as possible without the need to wait until a condition corresponding to the conditional handover candidate cell is met. The operation of executing a conditional handover includes one or a plurality of the following: a timer T304 is started; a target cell RRC configuration in a conditional handover configuration corresponding to a target cell is executed; a configuration in a synchronized reconfiguration information element corresponding to the target cell is executed; downlink synchronization to the target cell is performed; random access to the target cell is performed; and an RRC reconfiguration complete message is generated and submitted to a lower layer, and is transmitted.

The step further includes that the counter COUNT value is increased by 1.

Optionally, this embodiment further includes that the COUNT value is reset to 0 after the UE executes the handover successfully, or after the UE initiates the RRC connection re-establishment procedure, or after the UE completes the RRC connection re-establishment procedure successfully, or when configuration information comprising the counter COUNT, such as the configuration of the threshold of the counter, from a network side is received. The handover is executed successfully may be that a media access control (MAC) layer indicates that a random access procedure for accessing a target cell has been completed successfully, or an RRC connection reconfiguration complete message for responding to a handover command is transmitted successfully. The RRC connection re-establishment procedure is completed successfully may be that a response message such as an RRC connection re-establishment message of the RRC connection re-establishment request message is received successfully, or an RRC connection re-establishment complete message is transmitted successfully.

Optionally, before step 1, the method further includes that the UE receives configuration information including a timer COUNT, wherein a configuration of a threshold of the timer is included.

As a manner, the COUNT value may be pre-configured as 1. That is, the system only allows the UE to execute conditional handover link recovery function once for a certain link failure or handover failure. In this case, this embodiment may be performed as follows:

In step 1, an MCG RLF occurs on a radio link of the UE. Or a handover failure (HOF) occurs on the UE. The handover failure may be determined on the basis that the timer for monitoring the handover procedure expires, for example, T304 expires. The handover includes the conditional handover.

In step 2, if the UE is configured with a conditional handover and the UE does not execute the conditional handover recovery function before step 1, the UE may execute the conditional handover recovery function according to the implementation method 1 or the implementation method 2 or the foregoing embodiments.

That the conditional handover function is not executed may also be that the condition recovery function is not executed within a period of time. The period of time may be a pre-configured time length, or may be a time length configured through RRC signaling by the network side.

Preferably, that the condition recovery function is not executed is that the UE does not execute the cell selection procedure before (just before) step 1 or step 2, or the UE does not select a conditional handover candidate cell in the closest cell selection procedure just before step 1 or step 2.

Embodiment 7

Figure 3:
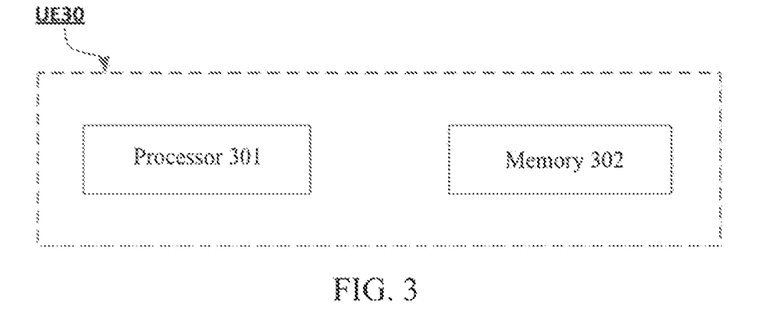
FIG. 3 is a block diagram showing the user equipment (UE) involved in the present invention.

In this embodiment, the user equipment according to the present disclosure is described. FIG. 3 is a block diagram showing the user equipment (UE) involved in the present invention. As shown in FIG. 3, the UE 30 includes a processor 301 and a memory 302. The processor 301 may include, for example, a microprocessor, a microcontroller, an embedded processor, and the like. The memory 302 may include, for example, a volatile memory (such as a random access memory (RAM), a hard disk drive (HDD), a non-volatile memory (such as a flash memory), or other memories. The memory 302 stores program instructions. When run by the processor 301, the instructions can perform the method for radio link recovery described in detail in the present invention.

In the present disclosure, some different embodiments can cooperate with each other.

In the present disclosure, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. Those skilled in the art can make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A user equipment (UE), comprising:
transmitting circuitry; and
a processor configured to, upon initiation of a radio resource control (RRC) connection reestablishment procedure, perform at least one action, wherein
the at least one action includes determining whether a conditional handover configuration is configured or not, and
the at least one action includes suspending all radio bearer(s) (RBs) except a signaling radio bearer 0 (SRB0) if the UE is not configured with the conditional handover configuration, wherein
the processor is further configured to perform a cell selection, and
the processor and the transmitting circuitry are configured such that:
if (i) the RRC connection reestablishment procedure is triggered by detecting a radio link failure of a master cell group (MCG) or a reconfiguration with sync failure of the MCG, (ii) the UE is enabled with a conditional handover link recovery function, and (iii) a selected cell is a conditional handover candidate cell indicated by a reconfigurationWithSync information element (IE) in the conditional handover configuration that is stored, the processor performs a handover according to the stored conditional handover configuration associated with the selected cell, and
otherwise, the UE performs one or more actions, wherein
the one or more actions include suspending, by the processor, all the RBs, except the SRB0, if the UE is configured with the conditional handover configuration, and
the one or more actions include initiating, by the transmitting circuitry, a transmission of an RRC Reestablishment Request message.

2. A method performed by a user equipment (UE), comprising:
upon initiation of a radio resource control (RRC) connection reestablishment procedure, performing at least one action, wherein
the at least one action includes determining whether a conditional handover configuration is configured or not, and
the at least one action includes suspending all radio bearer(s) (RBs) except a signaling radio bearer 0 (SRB0) if the UE is not configured with the conditional handover configuration;
performing a cell selection;
if (i) the RRC connection reestablishment procedure is triggered by detecting a radio link failure of a master cell group (MCG) or a reconfiguration with sync failure of the MCG, (ii) the UE is enabled with a conditional handover link recovery function, and (iii) a selected cell is a conditional handover candidate cell indicated by a reconfiguration WithSync information element (IE) in the conditional handover configuration that is stored, performing a handover according to the stored conditional handover configuration associated with the selected cell; and
otherwise, performing one or more actions, wherein
the one or more actions include suspending all the RBs, except the SRB0, if the UE is configured with the conditional handover configuration, and
the one or more actions include initiating a transmission of an RRC Reestablishment Request message.

* * * * *